Sept. 25, 1956     F. O. ALBERTSON ET AL     2,764,705
MOTOR REVERSING SWITCH MECHANISM
Filed Aug. 8 1955
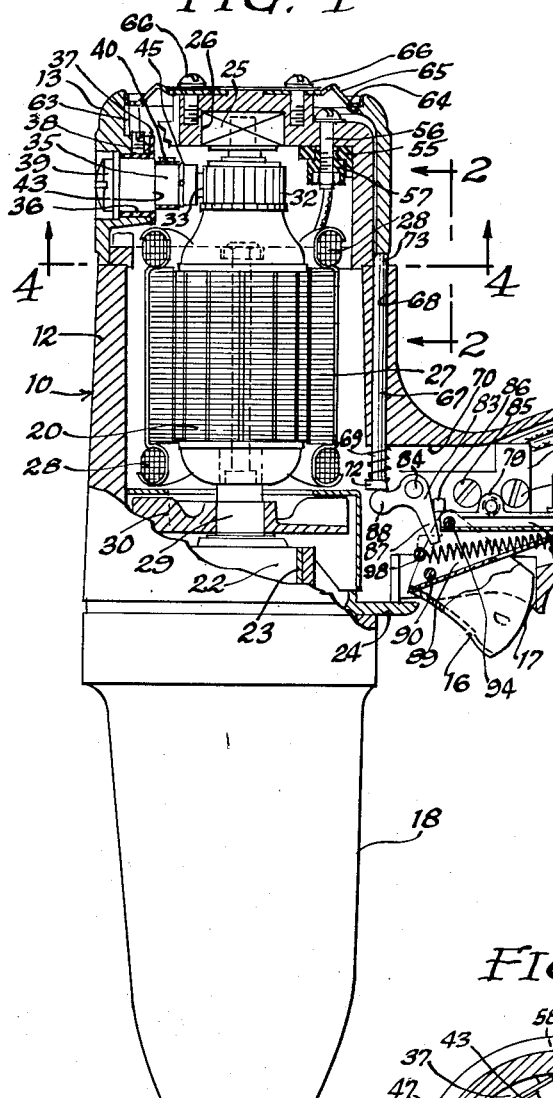
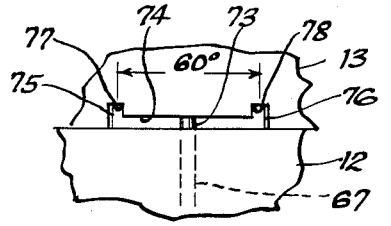
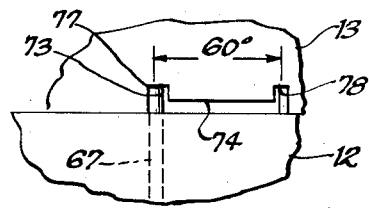
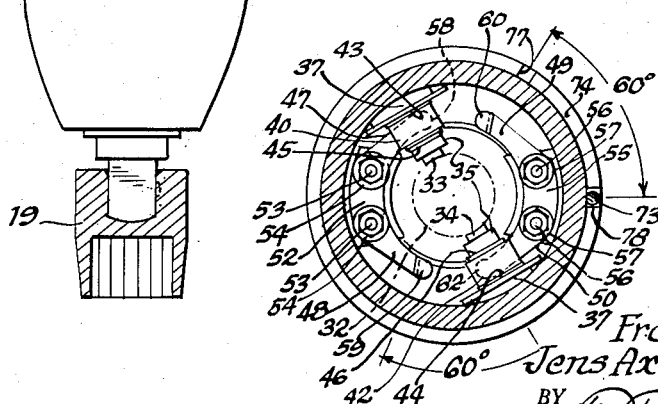
INVENTORS:
Frank O. Albertson
Jens Axel W. Madsen
BY
Attorney United States Patent Office 2,764,705
Patented Sept. 25, 1956

2,764,705

MOTOR REVERSING SWITCH MECHANISM

Frank O. Albertson and Jens Axel W. Madsen, Sioux City, Iowa, assignors to Albertson & Company, Inc., Sioux City, Iowa, a corporation of Iowa Application August 8, 1955, Serial No. 526,823

7 Claims. (Cl. 310—68)

This invention relates to switch mechanisms, and more particularly to a safety mechanism adapted to use in conjunction with reversing switches on reversible electric motors and the like.

One of the general objects of our invention is to provide an "on" and "off" switch for a reversible electric motor, the actuating parts for which switch are interlinked with the actuating parts of the motor reversing switch in a manner such that operation of the motor is prevented unless the reversing switch is in position for normal operation of the motor in one direction or the other.

As another object, our invention has within its purview the provision of a switch mechanism for use on a motor having one end housing part which carries the motor brushes and is shiftable rotationally relative to the motor rotor axis for effecting reversal of the direction of rotation of the motor rotor, and wherein a switch for controlling the operation of the motor is interlinked to the reversing switch in a manner which prevents the operation of the motor control switch unless the said end housing portion of the motor is in one or the other of two predetermined positions.

Our invention has for another object the provision of a reversing and operation control switch mechanism for use on motor operated hand tools and wherein the switch mechanism has parts interconnected to prevent reversal of the motor while it is being driven from a current source.

These and other objects of this invention will become apparent from the following detailed description when taken together with the accompanying drawings, in which Fig. 1 is a side elevational view of a power operated hand tool embodying a preferred form of our invention and having a portion of the structure shown in section to illustrate the adaptation of our invention to the operating parts of the tool;

Fig. 2 is a fragmentary side elevational view of a portion of the hand tool shown in Fig. 1 which is taken substantially at the position indicated by a line 2—2 in Fig. 1 and in the direction of the accompanying arrows;

Fig. 3 is a view similar to Fig. 2 with operating parts of the structure illustrated in different positions than those depicted in Fig. 2; and Fig. 4 is an end sectional view wherein the section is taken substantially at a position indicated by a line 4—4 in Fig. 1 and in the direction indicated by arrows.

Although our invention is not necessarily limited to power operated hand tools, the exemplary embodiment of the invention which is shown in the accompanying drawings for illustrative purposes depicts such an adaptation. In the illustrated structure, a motor 10 has a housing including a main body portion 12 and an end cap 13. A hand grip 14 in substantially the form of a pistol grip projects from one side of the main body portion 12 of the housing and serves as an enclosure and support for an "on" and "off" switch 15 which is actuated by a movable trigger 16 that normally projects through an opening 17 in the grip 14 at a position convenient for manual operation by an operator's finger when the grip 14 is held in one of the operator's hands.

A gear housing 18 is secured to the end of the main body portion 12 of the motor housing at the end thereof opposite the end cap 13. In the disclosed structure, a tool, such as a socket wrench 19, is driven by the motor 10 through a suitable gear mechanism included within the gear housing 18.

The motor 10 of the disclosed power operated tool has a rotor or armature 20 supported for rotation within the housing by a bearing 22 at one end thereof and carried in a retaining recess 23 in an end cover piece 24 which is secured to the main body portion 12 of the housing at the end opposite the end cap 13. At its other end, the motor rotor 20 is supported for rotation by a bearing 25 which is carried in a retaining recess 26 in the inner surface of the end cap 13. A laminated field core 27 is secured within the main body portion 12 of the housing and has field windings 28 thereon, which establish field poles closely adjacent the surface of the mid-portion of the rotor. The motor rotor has a shaft 29, the opposite ends of which are supported by the bearings 22 and 25 and which, in the disclosed structure, has a fan 30 secured thereto at the end adjacent the bearing 22 for circulating cooling air within the motor housing. At its other end, and within the end cap 13, the motor rotor is provided with a commutator 32, which commutator is engaged on opposite sides by brushes 33 and 34 supported from the end cap 13 and movable with that end cap to different positions for determining the direction of rotation of the motor rotor.

As depicted in Figs. 1 and 4, each of the brushes 33 and 34 is carried in a metal brush holder 35, which brush holders are mounted at diametrically opposed sides of the end cap 13 in bores such as 36 and are insulated from the end cap by flanged collars 37 of insulating material and secured in place relative to the end cap by fastening means such as set screws 38 threaded into end surface portions of the end cap 13. At their outer ends, the brush holders are closed by screw caps 39 made of insulating material and threaded into the ends of the brush holders. Although not shown herein, springs within the brush holders 35 bias the brushes 33 and 34 into contact with the commutator 32. In our disclosed structure, ring type contact collars 40 and 42 are mounted on the brush holders between shoulders 43 and 44 on the respective brush holders and resilient snap rings 45 and 46 which fit into grooves on the brush holders hold the contact rings in place, while permitting those rings to rotate during engagement and disengagement with resilient contact arms 47, 48, 49 and 50 which are supported within the end cap 13.

Contact arms 47 and 48 are supported and insulated from the end cap 13 by an insulating block 52, and are insulatingly secured in place relative to said block by fastening means such as screws 53 and intervening insulating collars 54. Likewise, contact arms 49 and 50 are insulated from, and supported relative to the end cap 13 by an insulating block 55 and are secured in place thereon by fastening means such as screws 56 and intervening insulating collars 57. At their extending ends, the contact arms 47, 48, 49 and 50 have shaped contact portions 58, 59, 60 and 62 respectively, which are disposed and aligned for engagement with the contact collars 42 and 43 on the brush holders. Access to the set screws 38 and screws 53 and 56 is attainable through suitable openings such as 63 and 64 in the end surface of the end cap, which openings are normally covered by a cover plate 65 held in place on the exterior surface of the end cap by fastening means such as screws 66.

The end cap 13 is mounted for limited rotational movement relative to the main body portion 12. When the end cap is in the position depicted in Fig. 4, the resilient contact arms 47 and 50 are engaged with the contact collars 40 and 42 on the brush holders, and the brushes engage the commutator at positions for efficient operation of the motor in one direction of rotation. For effecting reversal of the direction of rotation of the motor rotor, the end cap is movable from the position depicted in Fig. 4 to a position in which the contact collars 40 and 42 are engaged by the resilient contact arms 49 and 48 respectively. The brushes 33 and 34 move with the end cap, so that when the contact collars 40 and 42 are engaged by contact arms 49 and 48, the brushes are in a position for effecting efficient operation of the motor in the reverse direction. In the disclosed structure, the movement of the end cap relative to the main body portion of the housing for effecting reversal of the motor operation is approximately 60°.

In our disclosed motor structure, a movable element in the form of a plunger 67 is mounted for linear axial movement in a longitudinal bore 68 in the wall of the main body portion 12 of the housing. A compression spring 69 is mounted on the inner end of the plunger 67 between a surface 70 of the main body portion of the housing and a head 72 on the inner end of the plunger. This spring normally tends to retract an end portion 73 of the plunger which normally projects from the end surface of the main body portion adjacent the end surface of the end cap 13. The end cap 13 has a circumferentially extending recess 74 therein, into which recess the end portion 73 of the plunger normally projects. The circumferential length of the recess 74 corresponds to the required distance of movement of the brushes for effecting reversal of the motor operation and in such positions of the end cap, the normally projecting end portion 73 of the plunger engages end surfaces 75 or 76 of the recess 74. In the mid-portion of the recess, the depth of the recess 74 is such that it limits outward movement of the plunger 67 substantially beyond its normal position. However, at the opposite ends of the recess 74, notches 77 and 78 are provided, which notches are of a size for receiving the end portion 73 of the plunger 67 and are of a depth such that substantial movement of the plunger may be effected when the plunger is aligned with either of the notches, thereby to lock the end cap in a position such that the plunger is aligned with one of the notches at one end of the recess 74. Thus, when the plunger is actuated against the biasing force of the spring 69 and the end portion 73 thereof is engaged in one of the notches 77 or 78, as shown in Fig. 3, the end cap cannot be rotated relative to the main body portion of the housing.

In our disclosed structure, we have provided a linkage which effectively and operatively interconnects the plunger 67 to the operating trigger 16 which controls the "on" and "off" switch 15, whereby the plunger and its linkage serves as a stop for preventing sufficient movement of the trigger 16 to effect operation of the switch 15 when the end cap is in any position intermediate the end limits of its movement. This prevents current from being supplied to the motor when the brushes are not in positions for effecting efficient operation of the motor in one direction or the other and when there may be poor contact between the contact collars 40 and 42 and one pair of the contact arms 47, 48, 49 and 50. Furthermore, the linkage which we have provided for connecting the trigger 16 operatively to the plunger 67 effects movement of the end portion 73 of the plunger into one of the notches 77 or 78 to lock the end cap in one of its operating positions relative to the main body portion when the trigger is depressed sufficiently to effect operation of the switch 15 to the "on" position.

Referring in greater detail to the structure of the disclosed linkage which effects operation of the switch 15 from the trigger 16 and actuates the plunger 67, the switch 15 is supported within the hollow grip portion 14 of the main body of the housing by a bracket 79 having an extending arm 80 to which the switch is secured. A second bracket 82 has a bellcrank 83 secured thereto for rotational movement by fastening means such as a rivet 84 and is secured to the interior of the grip portion 14 by fastening means such as screws 85, which screws also extend through and secure the bracket 79 in place. A lug 86 is punched from the bracket 82 and projects upwardly adjacent an arm 87 of the bellcrank to serve as a stop for limiting rotational movement of the bellcrank in one direction, thereby limiting the retraction of the plunger 67 as a result of the biasing force of the spring 69 to a position such that the end portion 73 of the plunger projects into the recess 74 of the end cap, practically to a position of contact with the surface of the mid-portion of the recess; the end surface of the head 72 of the plunger being held in contact with an arm 88 of the bellcrank 83 by the spring 69.

The trigger 16 is supported for limited swinging movement relative to the grip portion 14 of the housing and on a projecting portion 89 of the switch supporting bracket 79 by means such as a rivet 90. A switch actuating slide 92, in the form of a channel, is supported for linear sliding movement in a channel portion 93 of the switch supporting bracket 79 and has an end portion connected to the trigger 16 at a position spaced from the rivet 90 by means such as a rivet 94. The positions of the rivets 90 and 94 are selected so that rotational swinging movement of the trigger 16 about the axis of the rivet 90 effects linear sliding movement of the slide 92 to effect actuation of the switch 15 between its "on" and "off" positions, thereby opening and closing a power supply circuit to the motor 10 through lead wires 95 and 96. A tension spring 97 having one end anchored to the switch support bracket 79 and its other end connected to a cross pin 98 on the trigger 16 normally biases the trigger 16 and slide 92 to positions such that the switch 15 is normally in its "off" position. Movement of the trigger 16 into the grip portion of the housing actuates the slide 92 to actuate the switch 15 to its "on" position.

When the trigger is moved into the grip portion 14 of the housing, the rivet 94 engages the arm 87 of the bellcrank to move that bellcrank about the axis of the rivet 84, so that the arm 88 of the bellcrank tends to move the plunger 67 against the biasing force of the spring 69. If the end portion 73 of the plunger is in the mid-portion of the recess 74, the movement of the plunger is stopped and the trigger 16 cannot be moved sufficiently to effect actuation of the switch 15 to its "on" position. This prevents power being supplied to the motor when the end cap 13 is in a position for effecting efficient operation of the motor in one of its directions of rotation. However, when the plunger is aligned with either of the notches 70 or 78 at the ends of the recess 74, movement of the trigger 16 not only actuates the switch 15 to its "on" position, but also forces the plunger to move linearly to a position such that the end portion 73 thereof is engaged in the notch with which it is aligned. This locks the end cap relative to the main body portion of the housing, so that it cannot be rotated to change the direction of operation of the motor while the motor is running.

While we have illustrated a preferred embodiment of our invention, many modifications may be made without departing from the spirit of the invention, and I do not wish to be limited to the precise details of construction set forth, but desire to avail myself of all changes within the scope of the appended claims.

Having thus described our invention, what we claim as new and desire to secure by Letters Patent of the United States is:

1. In combination with an electric motor having a rotor supported for rotation in an outer housing structure, said rotor having a commutator at one end, said outer housing including a main body portion and an end portion mounted for limited rotational movement relative to the main body portion between two separated and predetermined positions, and said end portion of the housing having brushes mounted therein for engagement with the commutator and movable with said end portion of the housing to positions corresponding to said two predetermined positions of the end portion for effecting rotation of the rotor in either of two directions, said end portion of the housing having a circumferentially extending recess therein adjacent the main body portion and corresponding in length to the spacing between said two predetermined positions, a plunger mounted for longitudinal sliding movement relative to the main body portion at a position aligned with the recess in the end portion, an "on" and "off" switch for the motor, a manually operable actuating element for the "on" and "off" switch, means for biasing the actuating element to a position in which the switch is in the "off" position, means for biasing the plunger away from said recess, a movable operating element providing an operating connection between the manually operable actuating element and the plunger for forcing the plunger into the recess when tht switch is actuated to the "on" position, stop means for normally holding the plunger in the recess, and notches at the ends of the recess for receiving the plunger when it is forced into the notch aligned therewith by operation of the manually operable actuating element.

2. In the combination as defined in claim 1, said end portion of the housing comprising a substantially cup-shaped end cap having a rim portion which seats against the main body portion of the housing, and said recess extending into the said rim portion and having a span of less than 180°.

3. In the combination as defined in claim 2, said recess being of substantially uniform depth between the notches at the ends thereof, and said notches each being of a size and shape to receive the end portion of the plunger for preventing appreciable movements of the end portion of the housing in either direction when the plunger is engaged therein.

4. In the combination as defined in claim 1, said movable operating element comprising a bell crank supported for rotational movement relative to the main body portion of the housing and having arm portions aligned for engagement with the plunger and the actuating element.

5. In combination with an electric motor having relatively movable housing portions, one of which carries means for effecting reversal of the direction of operation of the motor, said one of the housing portions having means thereon providing a circumferential recess having a length corresponding to the distance of movement of the one housing portion relative to the other which is required for effecting reversal of the motor operation, an element mounted for movement relative to said other of the housing portions and having an end normally disposed in said recess for limiting relative movements of the housing portions, notches at the ends of said recess which are deeper than the recess and of a size and shape for receiving the end of said movable element for holding the housing portions against relative movements when the end of the movable element is engaged therein, and means including an "on" and "off" switch for the motor for determining the position of the movable element.

6. In the combination as defined in claim 5, said movable element comprising a plunger aligned with said recess and mounted for linear movement into and from said notches.

7. In a motor operated hand tool having a trigger operated "on" and "off" switch for controlling the operation of the motor and a rotatable element for effecting reversal of the direction of operation of the motor, a movable element having one end associated with the rotatable element for normally serving as a stop to limit movements of the rotatable element, means serving as a linkage between the trigger operated "on" and "off" switch and the other end of the movable element for effecting movements of the movable element to positions for locking the rotatable element in either of its extreme positions of movement and for preventing operation of the "on" and "off" switch when the rotatable element is between said extreme positions.

No references cited.